United States Patent
Okada

(10) Patent No.: US 9,588,718 B2
(45) Date of Patent: Mar. 7, 2017

(54) IMAGE PROCESSING SYSTEM, IMAGE FORMATION APPARATUS, PROCESSING METHOD, AND NON-TRANSITORY COMPUTER-READABLE STORAGE MEDIUM STORING CONTROL PROGRAM

(71) Applicant: Konica Minolta, Inc., Chiyoda-ku, Tokyo (JP)

(72) Inventor: Tatsunori Okada, Nagaokakyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/080,973

(22) Filed: Mar. 25, 2016

(65) Prior Publication Data

US 2016/0283169 A1 Sep. 29, 2016

(30) Foreign Application Priority Data

Mar. 27, 2015 (JP) .................. 2015-066157

(51) Int. Cl.
```
G06F 15/00    (2006.01)
G06F 3/12     (2006.01)
G06K 1/00     (2006.01)
H04N 1/00     (2006.01)
H04N 1/21     (2006.01)
```

(52) U.S. Cl.
CPC .......... *G06F 3/1205* (2013.01); *G06F 3/1236* (2013.01); *G06F 3/1238* (2013.01); *G06F 3/1256* (2013.01); *G06F 3/1257* (2013.01); *G06F 3/1273* (2013.01); *G06F 3/1285* (2013.01); *H04N 1/00344* (2013.01); *H04N 1/00347* (2013.01); *H04N 1/21* (2013.01); *H04N 2201/0094* (2013.01)

(58) Field of Classification Search
CPC .. H04N 1/00344; H04N 1/00347; H04N 1/21; H04N 2201/0094; G06F 3/1205; G06F 3/1236; G06F 3/1238; G06F 3/1256; G06F 3/1257; G06F 3/1273; G06F 3/1285
USPC ............................... 358/1.1, 1.15, 1.13, 1.14
See application file for complete search history.

(56) References Cited

U.S. PATENT DOCUMENTS

| | | | |
|---|---|---|---|
| 2012/0198534 A1* | 8/2012 | Ohta | ..................... G06F 21/608 726/8 |
| 2013/0003125 A1 | 1/2013 | Morii | |
| 2015/0146253 A1* | 5/2015 | Uruma | ............... H04N 1/00832 358/1.15 |

FOREIGN PATENT DOCUMENTS

JP         2013033443 A       2/2013

* cited by examiner

*Primary Examiner* — Douglas Tran
(74) *Attorney, Agent, or Firm* — Cantor Colburn LLP

(57) ABSTRACT

When an MFP in a group accepts log-in, in a case where a log-in user is not a user belonging to the group, the MFP requests of other MFPs as representative apparatuses of other groups, for information about jobs associated with the log-in user stored in the other groups. Based on the information about the jobs from the other MFPs, the MFP displays a selection screen to accept selection of a job by the user. The MFP outputs a control request for the selected job to an MFP storing the job.

19 Claims, 9 Drawing Sheets

IMAGE PROCESSING SYSTEM, IMAGE FORMATION APPARATUS, PROCESSING METHOD, AND NON-TRANSITORY COMPUTER-READABLE STORAGE MEDIUM STORING CONTROL PROGRAM

CROSS REFERENCE TO RELATED APPLICATIONS

The present invention claims priority under 35 U.S.C. §119 to Japanese Application No. 2015-066157 filed Mar. 27, 2015, the entire content of which is incorporated herein by reference.

BACKGROUND OF THE INVENTION

Field of the Invention

The present disclosure relates to an image processing system, an image formation apparatus, a processing method, and a non-transitory computer-readable storage medium storing a control program. In particular, the present disclosure relates to an image processing system including a plurality of image formation apparatuses, an image formation apparatus included in the system, a method for processing a job in the system, and a non-transitory computer-readable storage medium storing a control program for the image formation apparatus included in the system.

Description of the Related Art

An image processing system may be constituted by connecting a plurality of image formation apparatuses such as multi-functional peripherals (MFPs) (for example, Japanese Laid-Open Patent Publication No. 2013-33443). Such a system is used for example in an office.

When an environment in which the system is used, such as an office, grows in size, a plurality of small systems, one for each area, may be constructed. For example, a small system is constructed for each local branch office. In this case, for example, by placing a central server and connecting each small system to the server, these small systems can be centrally managed.

A user of this system, who usually uses a first system, may desire to perform processing of a job managed by the first system, using a second system. For example, a case is assumed in which the user desires to perform processing of a job managed at his or her original base, using a system at a business trip destination.

However, when a small system is constructed for each area as described above, job management may be different for each small system. Therefore, an operation screen for job execution, a job processing flow, the type of data that can be handled, the amount of data, and the like in belonging MFPs may be different for each system.

As a specific example, an example will be given where the first system is a so-called serverless system, which does not have a server and in which any of MFPs manages jobs, and the second system is a system in which a server manages jobs.

In this case, when an MFP belonging to the first system accepts log-in by a user, the MFP inquires of MFPs belonging to the system about jobs associated with the user and obtains the jobs, and accepts selection of a job to be processed from among them, from the user. Therefore, the MFP belonging to the first system in which the user has logged displays a list of the jobs associated with the user managed by the MFPs.

When an MFP belonging to the second system accepts log-in by a user, the MFP obtains jobs associated with the user from the server, and accepts selection of a job to be processed from among them, from the user. Therefore, the MFP belonging to the second system in which the user has logged displays a list of the jobs associated with the user managed by the server.

In the case of the above example, a job associated with a user of a terminal apparatus is not managed by the server included in the second system. Therefore, the MFP belonging to the second system in which the user has logged cannot obtain the corresponding job according to the job management method in the second system.

As a result, the user who has connected to the MFP belonging to the second system using the terminal apparatus cannot process a job managed by the first system at the MFP in which the user has logged.

SUMMARY OF THE INVENTION

An object of the present disclosure in an aspect is to provide an image processing system that allows a user to flexibly perform an operation for a job. Further, an object of the present disclosure in an aspect is to provide an image formation apparatus constituting the image processing system that allows a user to flexibly perform an operation for a job. Further, an object of the present disclosure in an aspect is to provide a processing method in the image processing system that allows a user to flexibly perform an operation for a job. Further, an object of the present disclosure in an aspect is to provide a non-transitory computer-readable storage medium storing a control program for the image formation apparatus constituting the image processing system that allows a user to flexibly perform an operation for a job.

According to an embodiment, an image processing system includes a plurality of image formation apparatuses. The plurality of image formation apparatuses constitute a plurality of groups each including one or more image formation apparatuses. One of the image formation apparatuses included in each of the plurality of groups serves as a representative apparatus performing communication with an image formation apparatus included in another group as a representative. The image processing system includes a first memory apparatus for storing access information to the representative apparatus of the each group. Each of the plurality of image formation apparatuses includes: a first request unit that requests, in a case where the image formation apparatus accepts log-in by a user associated with a group different from a group to which the image formation apparatus belongs, of the representative apparatus of the group different from the group to which the image formation apparatus belongs, for information about jobs which are associated with the log-in user whose log-in has been accepted and are stored in an image formation apparatus belonging to the group to which the representative apparatus belongs, based on the access information stored in the first memory apparatus; a display unit that displays a selection screen based on the information about the jobs from the representative apparatus; and a second request unit that outputs a control request for a job selected on the selection screen to the image formation apparatus storing the job.

Preferably, the image processing system further includes a second memory apparatus for storing, for each user, information which specifies the group associated with the user. Each of the plurality of image formation apparatuses further includes a first determination unit that determines whether or not the log-in user is a user associated with the group to which the image formation apparatus belongs, based on the information stored in the second memory apparatus.

Preferably, the image processing system further includes a second memory apparatus for storing, for each user, information which specifies the group associated with the user, and a management apparatus. The management apparatus includes: a second determination unit that determines whether or not the log-in user is a user associated with the group to which the image formation apparatus which has accepted the log-in belongs, based on information which specifies the log-in user obtained from the image formation apparatus which has accepted the log-in and the information stored in the second memory apparatus; and a control unit that provides the image formation apparatus with a command indicating whether or not to permit the first request unit to make a request, based on a determination result obtained by the second determination unit. Each of the plurality of image formation apparatuses causes the first request unit to make the request to the representative apparatus, when permitted by the management apparatus.

Preferably, the first request unit requests of the representative apparatus of the group with which the log-in user is associated, of the plurality of groups, for the information about the jobs which are associated with the log-in user and are stored in the image formation apparatus belonging to the group.

Preferably, the image formation apparatus serving as the representative apparatus included in the each group further includes a transmission unit that receives a request for the information about the jobs associated with the log-in user from the image formation apparatus included in another group different from the group to which the representative apparatus belongs, obtains the information about the jobs from the image formation apparatus belonging to the group to which the image formation apparatus serving as the representative apparatus belongs, and transmits the information about the jobs to the image formation apparatus included in the other group.

Preferably, the image formation apparatus serving as the representative apparatus included in the each group further includes a registration unit that registers access information of the image formation apparatus in the first memory apparatus at predefined timing.

Preferably, the first request unit requests of the representative apparatus of the group different from the group to which the image formation apparatus belongs, for transmission of a job body associated with the log-in user as the information about the jobs.

More preferably, each of the plurality of image formation apparatuses further includes a selection unit that selects the job body to be obtained, from job bodies from the image formation apparatus storing the jobs, based on date and time information associated with each job body.

Preferably, the first request unit further requests of the representative apparatus of the group different from the group to which the image formation apparatus belongs, for information indicating a processing load state in the image formation apparatus storing the jobs, and the display unit displays the processing load state in the image formation apparatus storing the jobs, together with the selection screen.

More preferably, the information indicating the processing load state includes time taken until processing of each job can be started in the image formation apparatus storing the jobs.

Preferably, in a case where the jobs associated with the log-in user are stored in the image formation apparatus which has accepted the log-in, the display unit displays the selection screen based on the jobs associated with the log-in user stored in the image formation apparatus.

Preferably, the second request unit outputs the control request to the image formation apparatus storing the job, based on access information of the image formation apparatus storing the job obtained from the representative apparatus of the group different from the group to which the image formation apparatus belongs, together with the information about the jobs.

According to another embodiment, an image formation apparatus can communicate with another apparatus. A plurality of the image formation apparatuses constitute a plurality of groups each including one or more image formation apparatuses. One of the image formation apparatuses included in each of the plurality of groups serves as a representative apparatus performing communication with an image formation apparatus included in another group as a representative. The image formation apparatus includes: an obtaining unit that obtains access information to the representative apparatus, from a memory apparatus storing the access information for the each group; a log-in unit that accepts log-in by a user; a first request unit that requests, in a case where the log-in user whose log-in has been accepted is not a user associated with a group to which the image formation apparatus belongs, of the representative apparatus of a group different from the group to which the image formation apparatus belongs, for information about jobs which are associated with the log-in user and are stored in an image formation apparatus belonging to the group to which the representative apparatus belongs; a display unit that displays a selection screen based on the information about the jobs from the representative apparatus; and a second request unit that outputs a control request for a job selected on the selection screen to the image formation apparatus storing the job.

According to another embodiment, a processing method for a job in an image processing system including a plurality of image formation apparatuses is provided. The plurality of image formation apparatuses constitute a plurality of groups each including one or more image formation apparatuses. One of the image formation apparatuses included in each of the plurality of groups serves as a representative apparatus performing communication with an image formation apparatus included in another group as a representative. For each group, access information to the representative apparatus of the group is stored in a memory apparatus. The processing method includes: accepting log-in by a user in one image formation apparatus of the plurality of image formation apparatuses; requesting, in a case where the log-in user whose log-in has been accepted is not a user associated with a group to which the one image formation apparatus belongs, of the representative apparatus of a group different from the group to which the one image formation apparatus belongs, for information about jobs which are associated with the log-in user and are stored in an image formation apparatus belonging to the group to which the representative apparatus belongs, from the one image formation apparatus; displaying a selection screen in the one image formation apparatus, based on the information about the jobs from the representative apparatus; and outputting a control request for a job selected on the selection screen from the one image formation apparatus to the image formation apparatus storing the job.

Preferably, the processing method further includes determining whether or not the log-in user is a user associated with the group to which the one image formation apparatus belongs, based on information which specifies, for each user, the group associated with the user.

Preferably, the processing method further includes: determining whether or not the log-in user is a user associated with the group to which the one image formation apparatus which has accepted the log-in belongs, based on information which specifies the log-in user obtained from the one image formation apparatus which has accepted the log-in and information which specifies, for each user, the group associated with the user; and providing the image formation apparatus with a command indicating whether or not to permit execution of a request by requesting the information about the jobs, based on a determination result of the determining Requesting the information about the jobs includes making the request to the representative apparatus when execution of the request is permitted.

According to another embodiment, a control program for an image formation apparatus which can communicate with another apparatus is provided. A plurality of the image formation apparatuses constitute a plurality of groups each including one or more image formation apparatuses. One of the image formation apparatuses included in each of the plurality of groups serves as a representative apparatus performing communication with an image formation apparatus included in another group as a representative. For each group, access information to the representative apparatus of the group is stored in a memory apparatus. The control program causes a computer mounted in the image formation apparatus to execute: accepting log-in by a user; requesting, in a case where the log-in user whose log-in has been accepted is not a user associated with a group to which the image formation apparatus belongs, of the representative apparatus of a group different from the group to which the image formation apparatus belongs, for information about jobs which are associated with the log-in user and are stored in an image formation apparatus belonging to the group to which the representative apparatus belongs, based on the access information to the representative apparatus stored in the memory apparatus; displaying a selection screen based on the information about the jobs from the representative apparatus; and outputting a control request for a job selected on the selection screen to the image formation apparatus storing the job.

Preferably, the control program further causes the computer to execute determining whether or not the log-in user is a user associated with the group to which the image formation apparatus belongs, based on information which specifies, for each user, the group associated with the user.

Preferably, the image formation apparatus is configured to be able to communicate with a management apparatus. The management apparatus determines whether or not the log-in user is a user associated with the group to which the image formation apparatus which has accepted the log-in belongs, based on information which specifies the log-in user obtained from the image formation apparatus which has accepted the log-in and information which specifies, for each user, the group associated with the user. The management apparatus provides the image formation apparatus with a command indicating whether or not to permit execution of a request by requesting the information about the jobs, based on a determination result. Requesting the information about the jobs includes making the request to the representative apparatus when permitted by the management apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
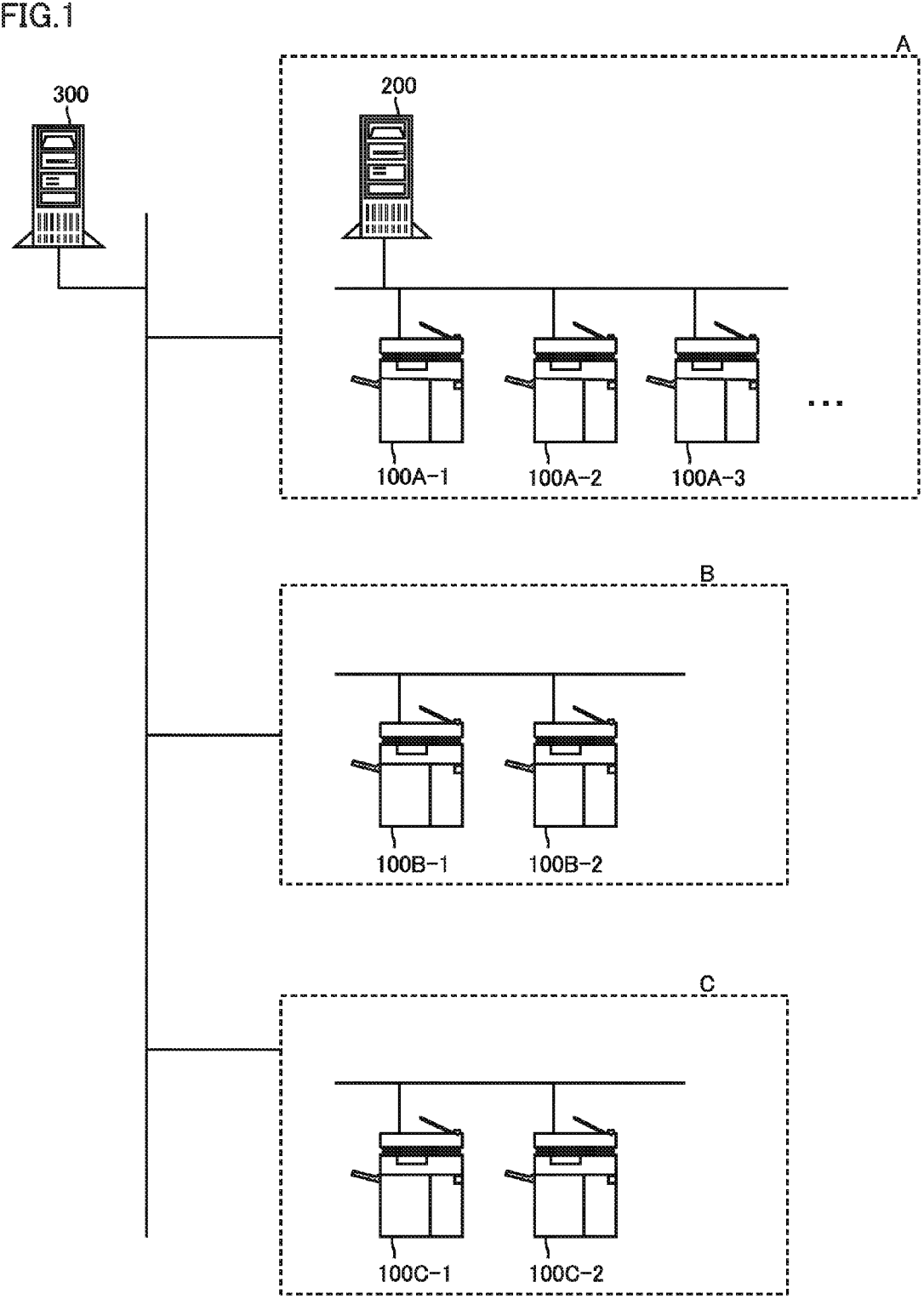
FIG. 1 is a view showing a specific example of a configuration of an image processing system (hereafter abbreviated as a "system") in accordance with an embodiment.

Hereinafter, an embodiment of the present invention will be described with reference to the drawings. In the description below, identical parts and components will be designated by the same reference numerals. Since their names and functions are also the same, the description thereof will not be repeated.

<System Configuration>

FIG. 1 is a view showing a specific example of a configuration of an image processing system (hereafter abbreviated as a "system") in accordance with the present embodiment. Referring to FIG. 1, the present system includes a plurality of multi-functional peripherals (MFPs) 100A-1, 100A-2, 100A-3, . . . , 100B-1, 100B-2, 100C-1, and 100C-2 as an example of an image formation apparatus, and a central server 300. These MFPs will be generically referred to as MFPs 100.

The plurality of MFPs 100 constitute a plurality of groups each including one or more MFPs 100. Each group constitutes a small system. That is, MFPs 100A-1, 100A-2, 100A-3, . . . are included in a group A. MFPs 100B-1 and 100B-2 are included in a group B. MFPs 100C-1 and 100C-2 are included in a group C. It should be noted that group A further includes a server 200, in addition to MFPs 100A-1, 100A-2, 100A-3, . . . . Server 200 can hold jobs.

MFPs 100 can communicate with each other. MFPs 100 can also communicate with central server 300. Central server 300 is a server for management, and can communicate with each MFP 100.

<Apparatus Configuration>

Figure 2:
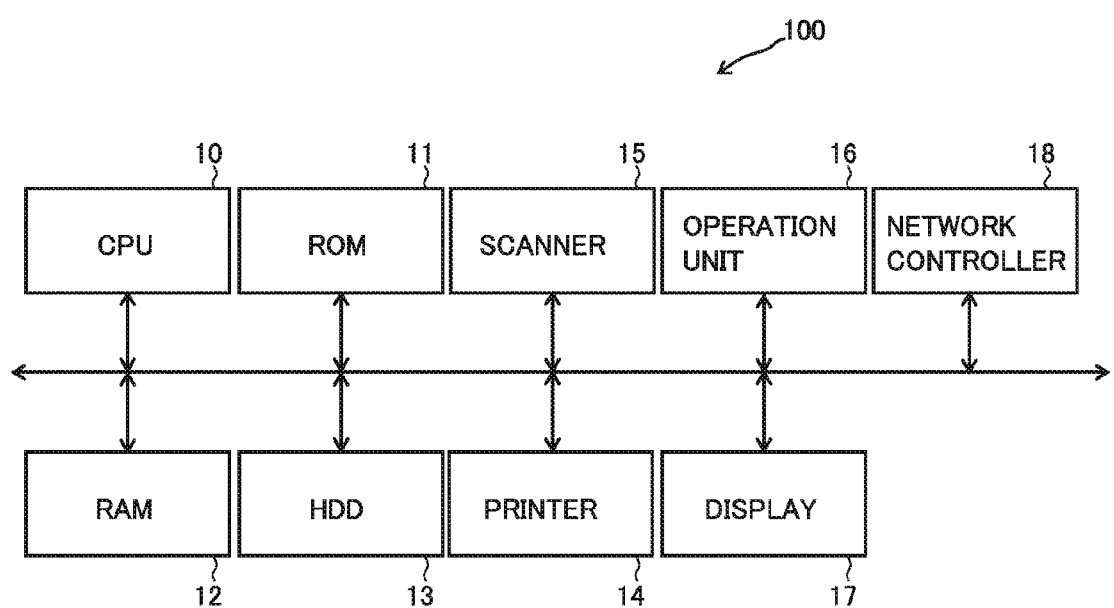
FIG. 2 is a block diagram showing an example of an apparatus configuration of a multi-functional peripheral (MFP) included in the system.

FIG. 2 is a block diagram showing an example of an apparatus configuration of MFP 100. Referring to FIG. 2, MFP 100 includes a central processing unit (CPU) 10 for controlling the entire apparatus, a read only memory (ROM) 11 for storing a program executed by CPU 10, a random access memory (RAM) 12 serving as a workspace when the program is executed by CPU 10, and a hard disk drive (HDD) 13 for storing jobs and the like.

MFP 100 further includes a printer 14, a scanner 15, an operation unit 16, a display 17, and a network controller 18. Network controller 18 controls communication with another MFP 100, or communication with server 200 or 300.

Figure 3:
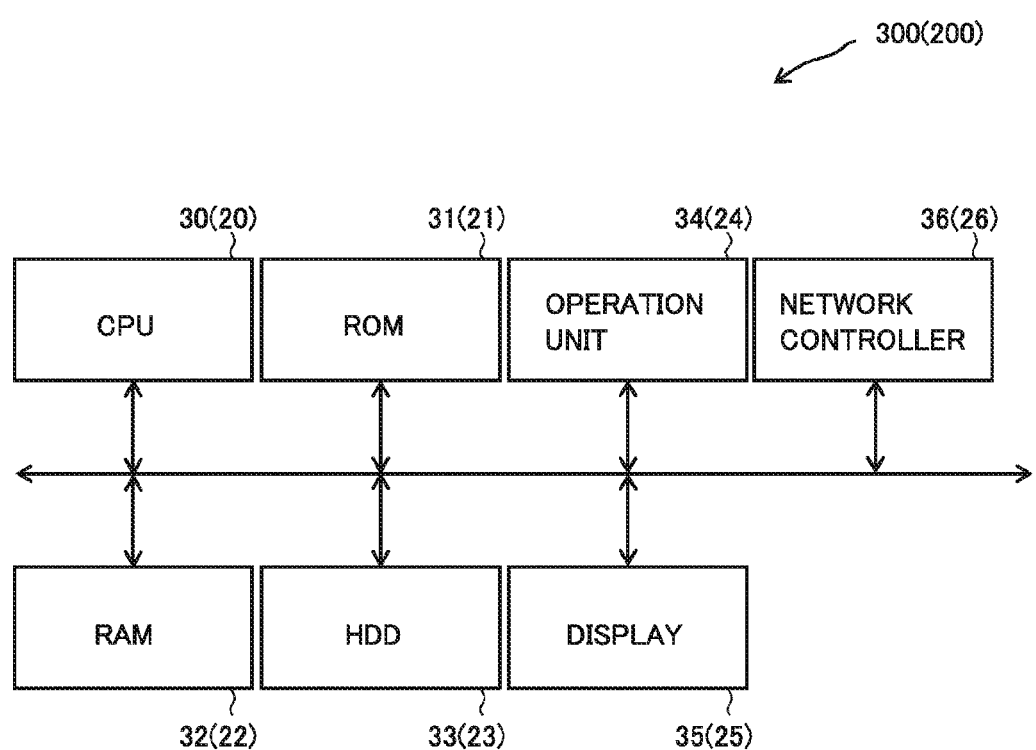
FIG. 3 is a block diagram showing an example of an apparatus configuration of a central server included in the system.

FIG. 3 is a block diagram showing an example of an apparatus configuration of central server 300. Central server 300 may be a common computer. Accordingly, FIG. 3 shows an apparatus configuration of a common computer as an example of a configuration of central server 300. Further, server 200 may also be a common computer. Accordingly, reference numerals 20 to 26 in FIG. 3 indicate components of server 200.

Referring to FIG. 3, central server 300 includes a CPU 30 for controlling the entire apparatus, a ROM 31 for storing a program executed by CPU 30, a RAM 32 serving as a workspace when the program is executed by CPU 30, and an HDD 33 for storing various data.

Further, central server 300 includes an operation unit 34, a display 35, and a network controller 36 for controlling communication with MFPs 100.

<Outline of Operation>

Groups A, B, and C are small systems constructed in different areas. The areas correspond to, for example, Tokyo head office, Osaka branch office, and Nagoya branch office. A user is associated with any of the groups. For example, a user, who is an employee, is associated with an area where the department to which the user belongs is located. Information of the area to which each user belongs is stored as user information in central server 300.

On MFPs 100 belonging to each system, a program for executing image processing according to the belonging system is installed. Then, CPU 10 of MFP 100 executes the program to perform image processing operation shown in FIG. 4 or 5.

The system serving as group A includes server 200 for holding jobs. In group A, a job issued to the system by a user belonging to the group is held in server 200. Then, when MFP 100 belonging to group A accepts log-in by the user belonging to the group, MFP 100 obtains the corresponding job from server 200 and processes the job (for example, prints the job). Such a system is also called a ubiquitous system.

Figure 4:
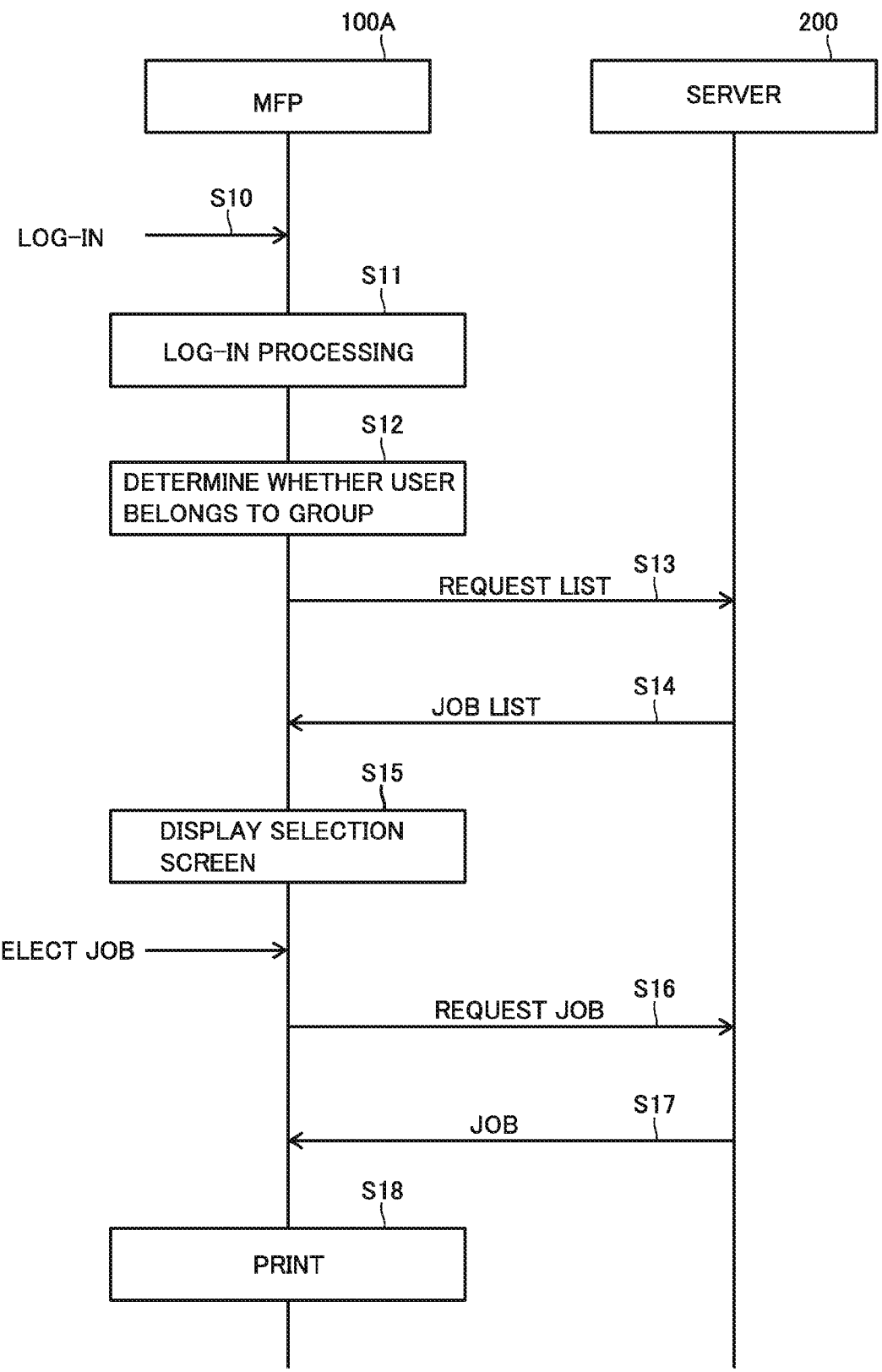
FIG. 4 is a view showing an outline of operation of a group A of the system.

FIG. 4 is a view showing an outline of operation of group A. Referring to FIG. 4, when any MFP 100A belonging to group A accepts log-in from a user (step S10), MFP 100A executes log-in processing such as user authentication (step S11). Further, as an example, MFP 100A determines whether or not the user who has logged in (log-in user) is a user belonging to the group, by referring to the user information stored in central server 300 (step S12). The determination in step S12 may be performed as a part of the log-in processing in step S11, or may be performed by central server 300 and MFP 100A may obtain a determination result from central server 300.

In step S12, as another example, MFP 100A may determine whether or not the log-in user is a user belonging to the group, based on a user operation. In this case, for example, buttons such as "belonging user" and "business traveler" may be prepared on a screen for displaying a log-in screen. Based on an operation of the user selecting any of the buttons, MFP 100A can determine which of the categories the log-in user belongs to. The determination of whether or not the log-in user is a user belonging to the group may also be made by such a determination method in the description below.

In a case where the log-in user is a user belonging to group A, MFP 100A requests of server 200 for information about jobs associated with the user (step S13). The information about the jobs is information which specifies each job, including, for example, the name of the job, the date and time when the job was produced, the person who produced the job, the date and time when the job was issued, the size of the job, and the like. The information about the jobs will also be referred to as a job list in the description below.

When MFP 100A obtains a job list for the user from server 200 (step S14), MFP 100A displays a job selection screen on display 17 (step S15). The job selection screen is a screen on which the jobs associated with the log-in user held in server 200 are presented to be selectable. MFP 100A accepts selection of a job to be processed from among them.

When MFP 100A accepts selection of a job from the log-in user, MFP 100A requests of server 200 for a body of the selected job (step S16). When MFP 100A obtains the corresponding job body from server 200 (step S17), MFP 100A performs designated processing on the job, such as printing of the job (step S18).

Each of groups B and C does not include a server, and includes a plurality of MFPs 100. In group B or C, a job issued to the system by a user belonging to the group is held in any MFP 100 belonging to the group. Then, when MFP 100 belonging to group B or C accepts log-in by the user belonging to the group, MFP 100 inquires of each MFP 100 of the group to which it belongs whether or not the job is present. The MFP which has accepted the log-in obtains the corresponding job from an MFP which holds the job, and processes the job (for example, prints the job). Such a system is also called a serverless ubiquitous system.

Figure 5:
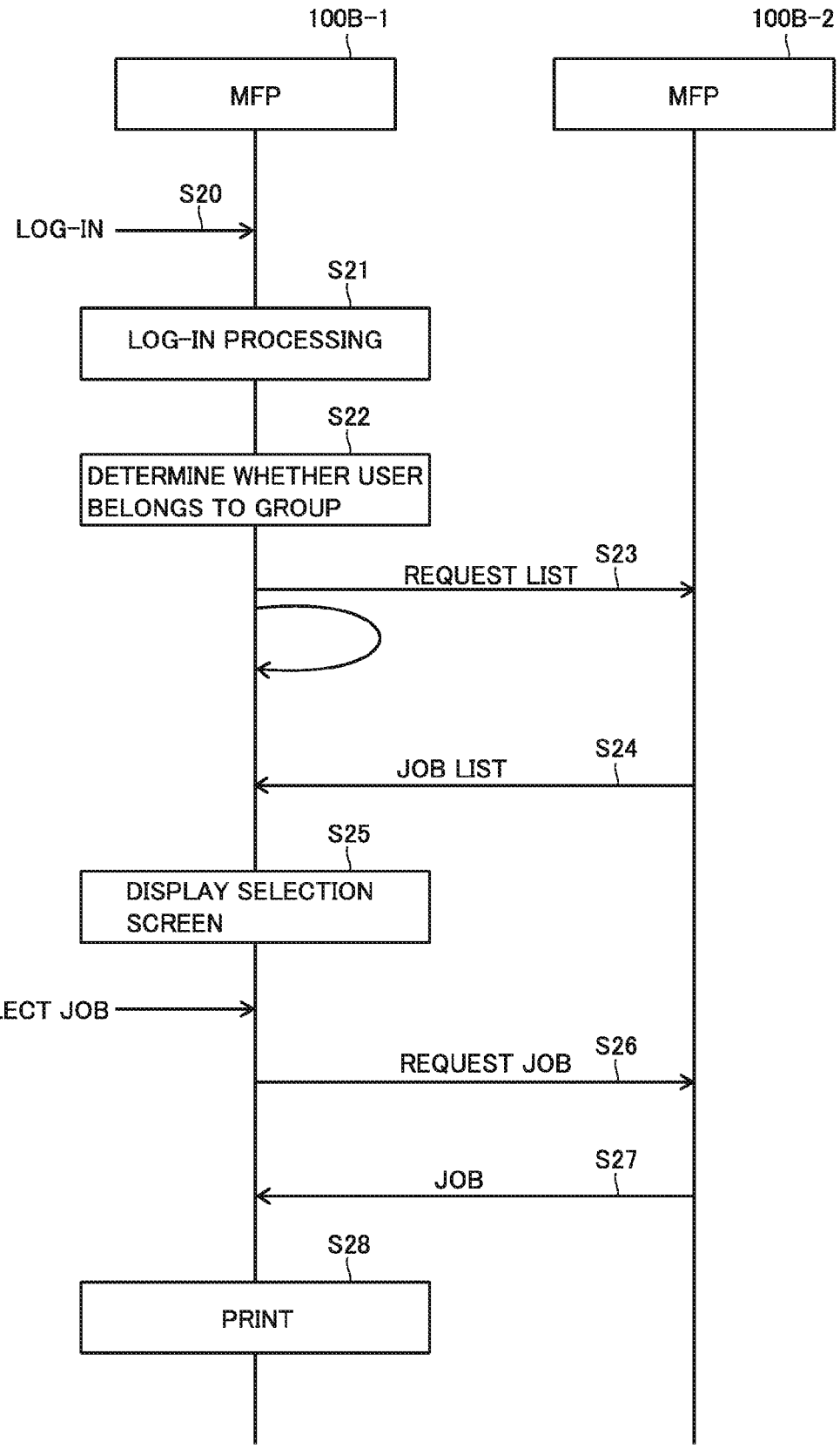
FIG. 5 is a view showing an outline of operation of a group B of the system.

FIG. 5 is a view showing an outline of operation of group B. An outline of operation of group C is identical to the outline of operation shown in FIG. 5.

Referring to FIG. 5, when any MFP 100B belonging to group B accepts log-in from a user (step S20), MFP 100B executes log-in processing such as user authentication (step S21). Further, MFP 100B determines whether or not the log-in user is a user belonging to the group, by referring to the user information stored in central server 300 (step S22). The determination in step S22 may be performed as a part of the log-in processing in step S21, or may be performed by central server 300 and MFP 100B may obtain a determination result from central server 300.

In a case where the log-in user is a user belonging to group B, MFP 100B requests of each MFP 100B belonging to group B for a job list, which is information about jobs associated with the user (step S23). When MFP 100B obtains the job list for the user from an MFP 100B belonging to group B (step S24), MFP 100B displays a job selection screen on display 17 (step S25).

When MFP 100B accepts selection of a job from the log-in user, MFP 100B requests of MFP 100B which holds the job, of MFPs 100B belonging to group B, for a body of the selected job (step S26). When MFP 100B obtains the corresponding job body from that MFP 100B (step S27), MFP 100B performs designated processing on the job, such as printing of the job (step S28).

Meanwhile, some users may desire to process a job issued to the group to which the user belongs, at a group different from the group to which the user belongs. For example, a case is assumed in which the user desires to process a job issued to his or her original system, using a system at a business trip destination.

However, as shown in FIGS. 4 and 5, MFP 100 which has accepted the log-in requests of an apparatus belonging to a group to which it belongs, for a job list of corresponding jobs. Further, a job processing flow in group A is different from that in groups B and C. Specifically, the destination to which MFP 100 which has accepted the log-in requests a job list in group A is different from that in groups B and C.

Therefore, when a user belonging to a different group logs in, MFP 100 which has accepted the log-in cannot obtain a job list from the different group, according to the above operation. Thereby, the user cannot cause MFP 100 in which the user has logged to perform processing of a job intended.

Consequently, in the present system, central server 300 stores beforehand access information of at least one MFP 100 of MFPs 100 belonging to each group, as access information. The at least one MFP will also be referred to as a representative MFP of the group to which it belongs. The access information is information which specifies that MFP on a network, including an IP (Internet Protocol) address, an access point, and the like.

Then, MFP 100 which has accepted the log-in requests of a representative MFP of a group to which a log-in user belongs, for a job list of corresponding jobs, by referring to the above access information stored in central server 300.

Figure 6:
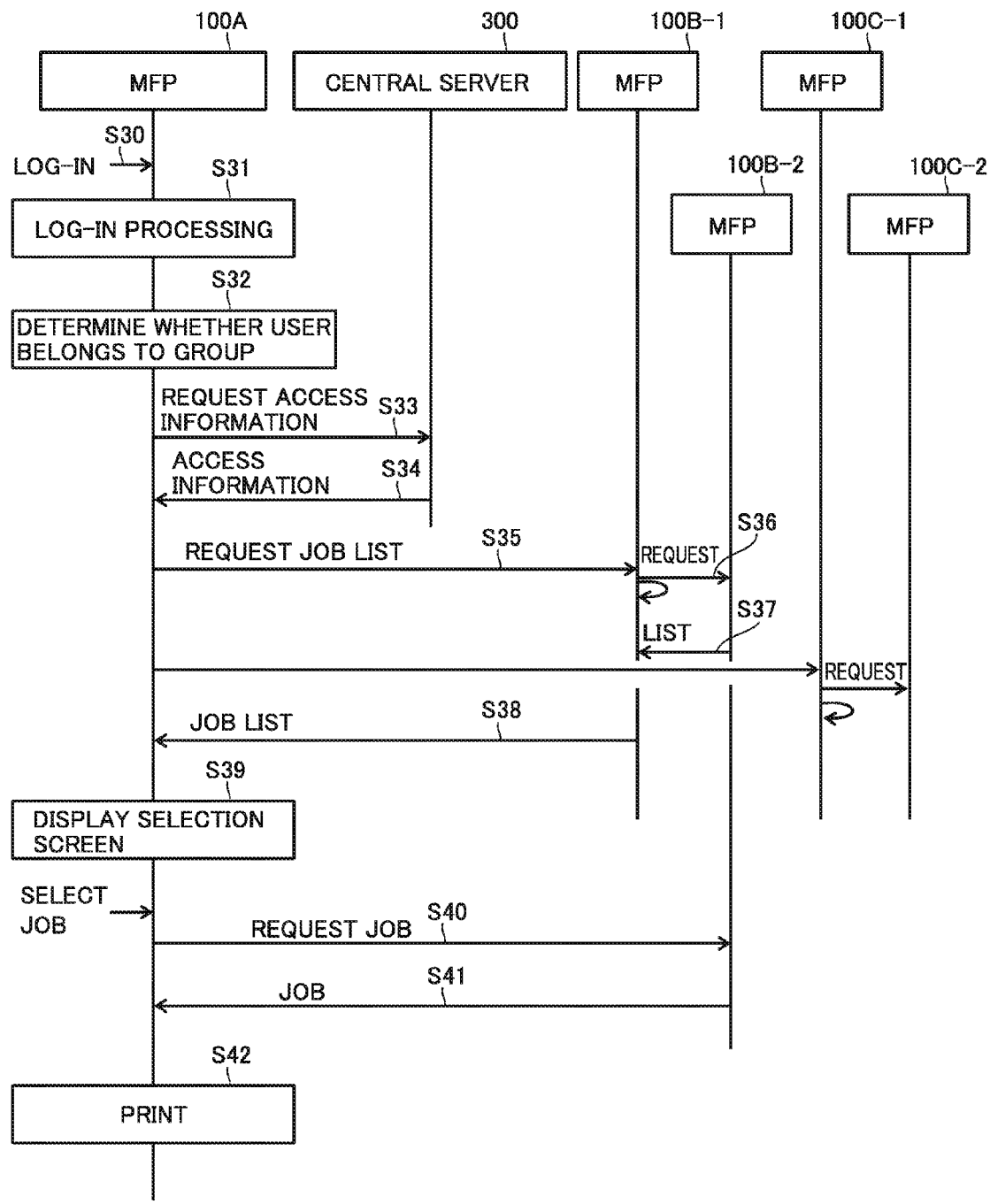
FIG. 6 is a view showing an outline of operation of group A in a case where a user belonging to group B or a group C logs in an MFP 100A belonging to group A.

On MFPs 100, a program for performing the above operation shown in FIG. 6 is also installed. In a case where a user associated with a group to which MFP 100 belongs logs in, CPU 10 of MFP 100 does not execute the above program to perform the operation in FIG. 4 or 5. In this case, execution of the above program may be restricted by central server 300 to prevent CPU 10 from executing the above program. In a case where a user associated with a group different from the group to which MFP 100 belongs logs in, CPU 10 of MFP 100 executes the above program to perform the operation in FIG. 6.

FIG. 6 shows an outline of operation in a case where a user belonging to a different group logs in. As an example, FIG. 6 is a view showing an outline of operation of group A in a case where a user belonging to group B or group C logs in MFP 100A belonging to group A.

Referring to FIG. 6, when MFP 100A belonging to group A accepts log-in from the user (step S30), MFP 100A executes log-in processing such as user authentication (step S31). As an example, MFP 100A determines that the log-in user is not a user belonging to the group, by referring to the user information stored in central server 300 (step S32).

In this case, MFP 100A requests of central server 300 for access information (step S33). When MFP 100A obtains the access information from the central server (step S34), MFP 100A requests of the representative MFP of each group for a job list of jobs associated with the log-in user (step S35).

When each of MFP 100B-1 and 100C-1, which serves as the representative MFP of each group, receives a request for a job list from MFP 100A, it requests of each MFP included in group B, C to which it belongs, for a job list of corresponding jobs (step S36). Then, upon obtaining the job list (step S37), MFP 100B-1, 100C-1 as the representative MFP transmits the job list to MFP 100A (step S38).

In the example of FIG. 6, MFP 100B-2 belonging to group B holds the jobs associated with the log-in user of MFP 100A. Therefore, MFP 100B-2 transmits the job list of corresponding jobs to MFP 100B-1, in response to the request for a job list from MFP 100B-1 in step S36. Then, MFP 100B-1 serving as the representative MFP of group B, which has obtained the job list, transmits the job list to MFP 100A.

When MFP 100A obtains the job list for the log-in user from the representative MFP of another group, MFP 100A displays a job selection screen on display 17 (step S39).

Preferably, MFP 100A also requests of the representative MFP of each group for information indicating a processing load state of the MFP which holds the corresponding jobs, together with the job list. The information indicating the processing load state includes, for example in a case where transmission of a job is instructed as processing of the job, time taken until the transmission is started, time required for the transmission, and the like. Then, when MFP 100A obtains the information indicating the processing load state of the MFP which holds the corresponding jobs, together with the job list, MFP 100A displays the information indicating the processing load state of the MFP which holds the corresponding jobs, such as waiting time in the case where transmission of a job is instructed, a ready/busy state, and the like, together with the job list, on the job selection screen.

In the case where the log-in user is a user not associated with group A as described above, the MFP which holds the corresponding jobs is often not in the vicinity of the user. Accordingly, the user often cannot easily grasp the processing load state of the MFP which holds the corresponding jobs. Consequently, by also presenting the processing load state of the corresponding MFP, the processing load state can serve as information for determining which job to select.

When MFP 100A accepts selection of a job from the log-in user, MFP 100A requests a body of the selected job (step S40). Preferably, when the job list is transmitted from the representative MFP to MFP 100A in step S38, access information of the MFP which holds the corresponding jobs is also transmitted. Then, in step S40, MFP 100A can request a job body to the MFP which holds the jobs, using the access information. As another example, in step S40, MFP 100A may request of the representative MFP for a body of the job, and representative MFP 100 may mediate transmission of the job from MFP 100 which holds the job to MFP 100A.

When MFP 100A obtains the job body (step S41), MFP 100A performs designated processing on the job, such as printing of the job (step S42).

It should be noted that, in the above description, MFP 100 which has accepted log-in by a user associated with another group inquiries of the representative MFP of each group about the corresponding jobs. As another example, MFP 100 may check whether the corresponding jobs are held in HDD 13 of MFP 100 or server 200, and in a case where they are not held therein, MFP 100 may inquire of the representative MFP of each group about the corresponding jobs.

<Functional Configuration>

Figure 7:
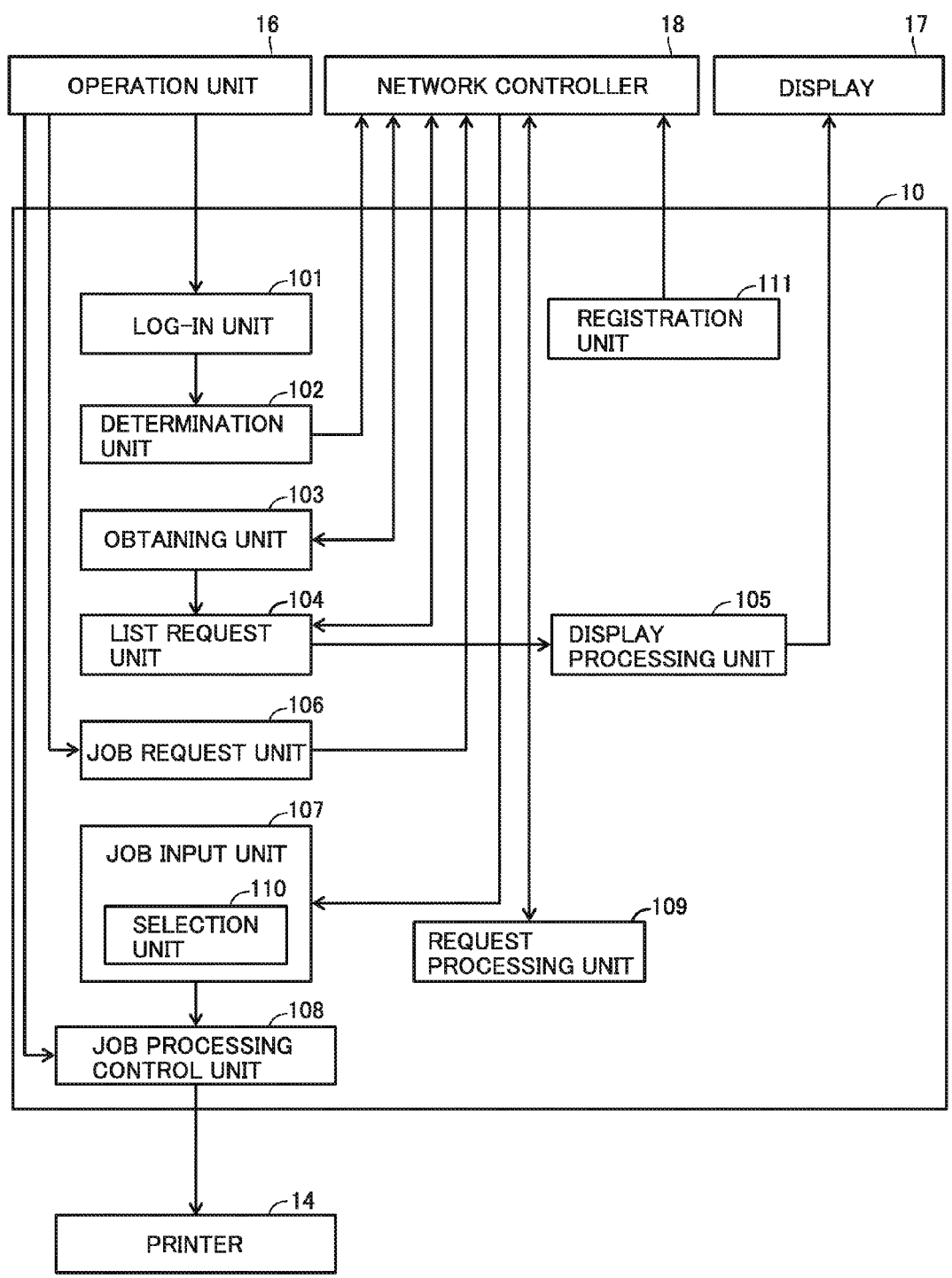
FIG. 7 is a block diagram showing an example of a functional configuration of the MFP.

FIG. 7 is a block diagram showing an example of a functional configuration of MFP 100 for performing the above operation. Each function in FIG. 7 is mainly implemented by CPU 10 of MFP 100, by CPU 10 reading out the program stored in ROM 11 on RAM 12, and executing the program. However, at least a part of the functions may be implemented by other hardware shown in FIG. 2, or hardware not shown such as electric circuitry.

Referring to FIG. 7, CPU 10 of MFP 100 includes a log-in unit 101 and a determination unit 102. Log-in unit 101 accepts a log-in operation on operation unit 16 by a user, and executes processing for log-in. Determination unit 102 determines whether or not the log-in user is a user associated with a group to which MFP 100 belongs, by referring to the user information stored in central server 300.

Further, CPU 10 includes an obtaining unit 103, a list request unit 104, a display processing unit 105, a job request unit 106, a job input unit 107, and a job processing control unit 108.

In a case where the log-in user is not a user associated with the group to which MFP 100 belongs, obtaining unit 103 requests of central server 300 for access information of the representative MFPs of other groups, and obtains the access information from central server 300.

List request unit 104 requests of the representative MFPs of other groups for a job list of jobs associated with the log-in user using the obtained access information, and obtains the job list. Display processing unit 105 performs processing for displaying a selection screen for selecting a job to be processed on display 17, based on the job list from the representative MFP.

Preferably, list request unit 104 also requests access information of an MFP which holds the corresponding jobs, together with the job list.

In addition, preferably, list request unit 104 also requests information indicating a processing load state of the MFP which holds the corresponding jobs, together with the job list. In this case, display processing unit 105 also displays the information indicating the processing load state of the MFP which holds the corresponding jobs, together with the job list, on the selection screen. The information indicating the processing load state is, for example, a ready/busy state, waiting time in the case where transmission of a job is instructed, and the like.

When selection of a job to be processed is accepted, job request unit 106 requests of the MFP which holds the selected job for transmission of the job, as a control request for the job. The control request for the job may be a request to delete, copy, or move the job, for example.

Job request unit 106 may request of the representative MFP of the group to which the MFP which holds the job belongs, for transmission of the job. Alternatively, in a case where the access information of the MFP which holds the job is obtained together with the job list, job request unit 106 may directly request of the MFP which holds the job for transmission of the job, using the access information. Job input unit 107 accepts input of the selected job.

Job processing control unit 108 executes processing of the input job, such as printing of the job using printer 14.

In a case where MFP 100 is a representative MFP, CPU 10 further includes a request processing unit 109 and a registration unit 111. Request processing unit 109 processes a job list request from an MFP of another group. That is, when a job list is requested from an MFP of another group, request processing unit 109 checks whether or not corresponding jobs are present in server 200, and in a case where the corresponding jobs are held in server 200, request processing unit 109 transmits a job list of the jobs to the MFP of the other group which has requested the job list. It should be noted that, in a case where MFP 100 is an MFP included in a so-called serverless ubiquitous system described above (for example, in a case where MFP 100 is an MFP included in group B or C), when request processing unit 109 accepts the above request, request processing unit 109 inquires of another MFP within the group about whether or not corresponding jobs are present, and transmits a job list of the corresponding jobs to the MFP of the other group which has requested the job list.

Registration unit 111 transmits access information of the MFP serving as a representative MFP to central server 300 at predefined timing, and thereby registers the access information in central server 300. The predefined timing is, for example, at the time when MFP 100 is started, a predefined time interval, at the time when a user operation for instructing transmission of access information is performed on MFP 100, at the time when a request from central server 300 is accepted, or the like.

Figure 8:
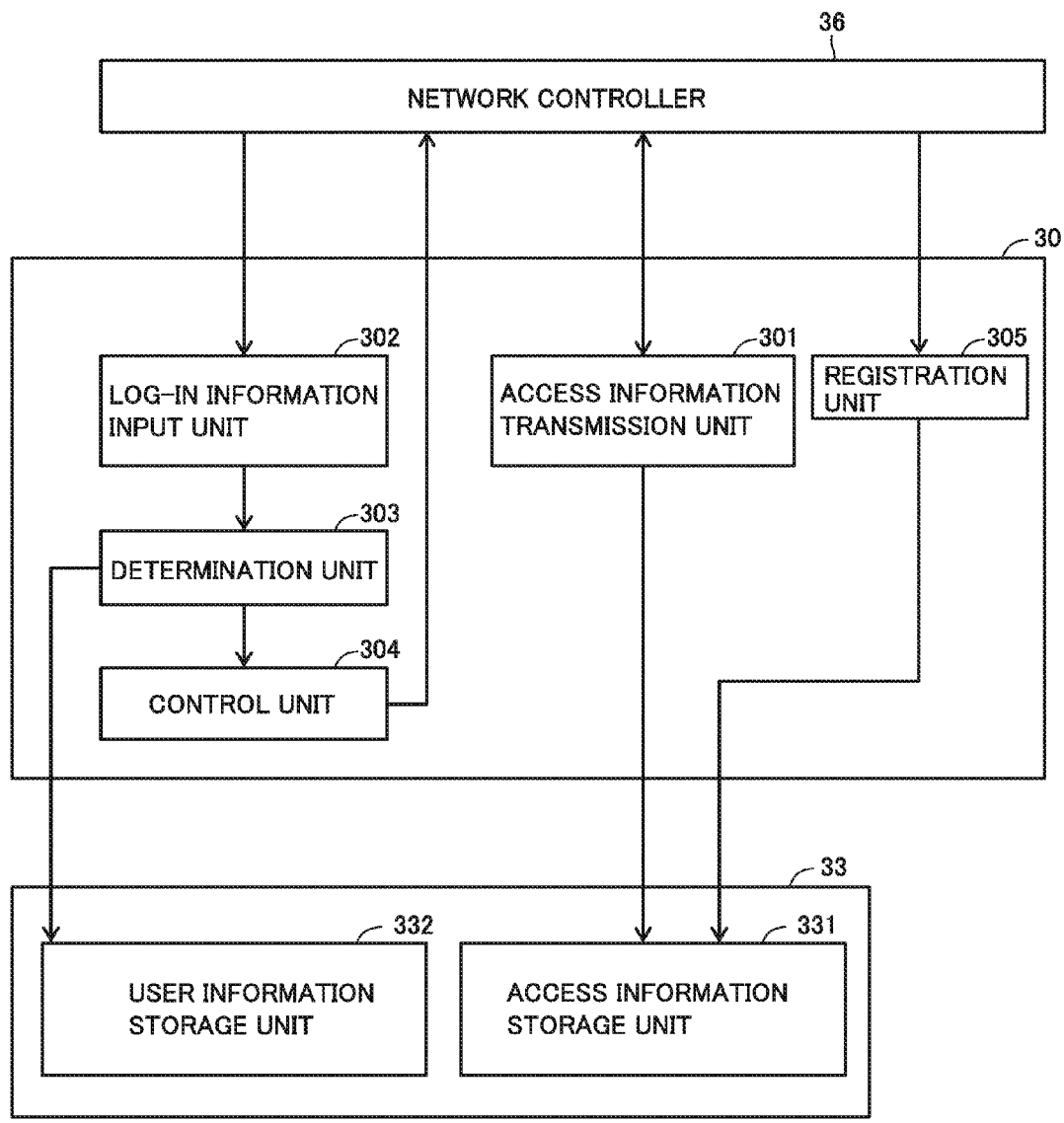
FIG. 8 is a block diagram showing an example of a functional configuration of the central server.

FIG. 8 is a block diagram showing an example of a functional configuration of central server 300 for performing the above operation. Each function in FIG. 8 is mainly implemented by CPU 30 of central server 300, by CPU 30 reading out the program stored in ROM 31 on RAM 32, and executing the program. However, at least a part of the functions may be implemented by other hardware shown in FIG. 3, or hardware not shown such as electric circuitry.

Referring to FIG. 8, CPU 30 of central server 300 includes an access information transmission unit 301 and a registration unit 305.

Access information transmission unit 301 accepts a request for access information from MFP 100, reads out access information stored in an access information storage unit 331 of HDD 33, and transmits it to MFP 100 which has made the request.

Registration unit 305 accepts input of access information from the representative MFP of each group, and resisters the access information in access information storage unit 331. The access information is transmitted from the representative MFP at defined timing. Alternatively, registration unit 305 may request of the representative MFP of each group for the access information at predefined timing.

Preferably, CPU 30 includes a log-in information input unit 302, a determination unit 303, and a control unit 304. Log-in information input unit 302 accepts input of information of the log-in user from MFP 100. Determination unit 303 determines whether or not the log-in user of MFP 100 is a user associated with a group to which MFP 100 belongs, by referring to user information stored in a user information storage unit 332 of HDD 33. Control unit 304 provides MFP 100 with a command indicating whether or not to permit MFP 100 to request of the representative MFPs of other groups for a job list, based on a determination result obtained by determination unit 303. That is, in a case where the log-in user is not a user associated with the group to which MFP 100 belongs, control unit 304 permits MFP 100 to request of the representative MFPs of other groups for a job list, and in a case where the log-in user is a user associated with the group to which MFP 100 belongs, control unit 304 does not permit MFP 100 to request of the representative MFPs of other groups for a job list.

In this case, CPU 10 of MFP 100 performs the above operation by exhibiting each function shown in FIG. 7, only in a case where it receives the command for permission from central server 300.

<Operational Flow>

Figure 9:
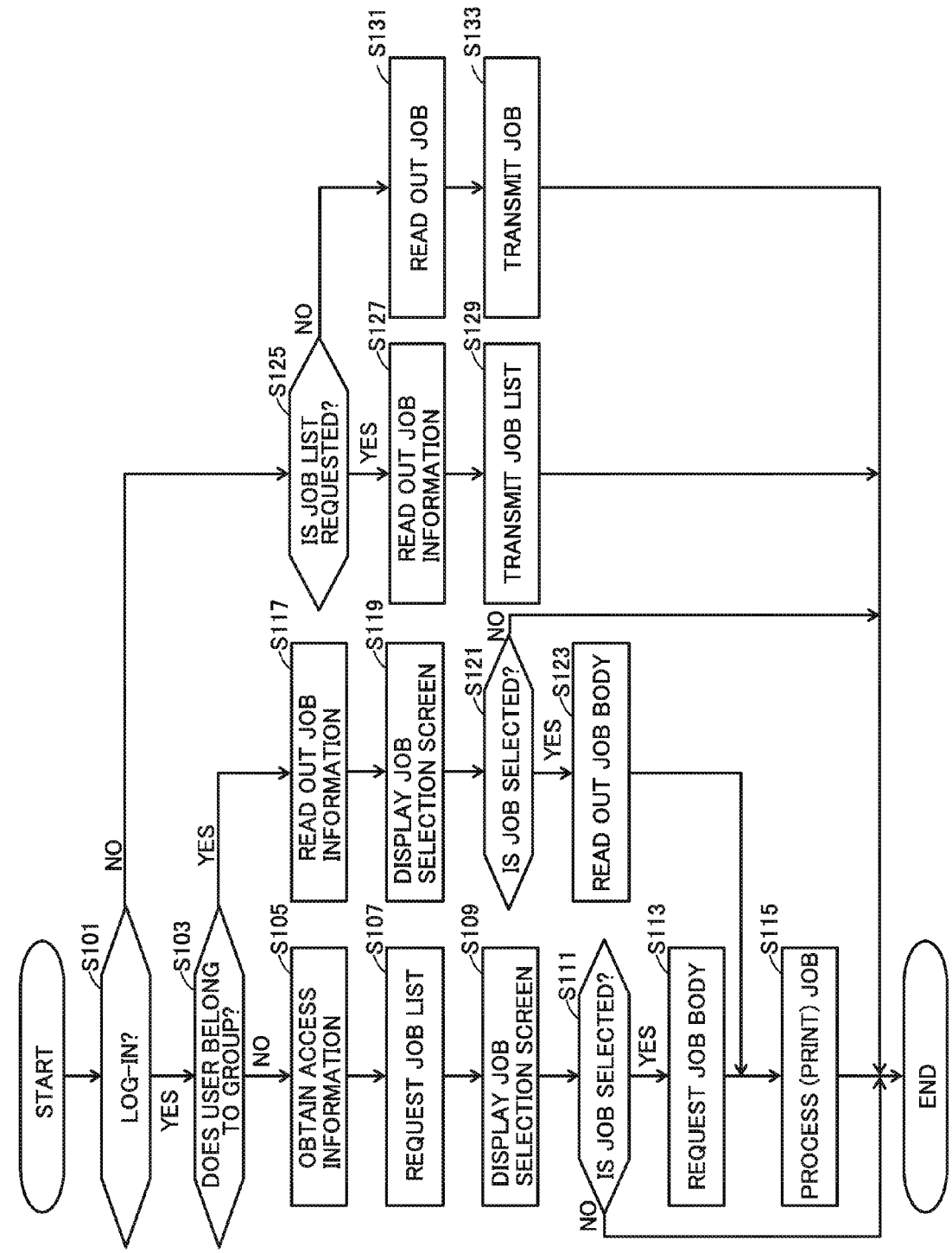
FIG. 9 is a flowchart showing a specific example of a flow of operation of the MFP.

FIG. 9 is a flowchart showing a specific example of a flow of operation of MFP 100. The operation shown in the flowchart of FIG. 9 is implemented by CPU 10 of MFP 100 reading out the program stored in ROM 11 on RAM 12, and executing the program to exhibit the functions in FIG. 7.

Referring to FIG. 9, in a case where MFP 100 accepts log-in from a user (YES in step S101), CPU 10 checks whether or not the log-in user is a user associated with a group to which MFP 100 belongs. During this checking, CPU 10 may read out user information from central server 300, or may pass log-in information to central server 300 and request central server 300 to check the log-in information.

In a case where the log-in user is not a user associated with the group to which MFP 100 belongs (NO in step S103), CPU 10 obtains access information of the representative MFP of each group from central server 300 (step S105). Then, CPU 10 requests of the representative MFP for a job list, by referring to the access information (step S107).

When CPU 10 obtains a job list from the representative MFP, CPU 10 displays a selection screen for selecting a job to be processed on display 17, based on the job list (step S109). When CPU 10 accepts a user operation for selecting a job to be selected on the screen (YES in step S111), CPU 10 requests of an MFP which holds the selected job for a body of the job (step S113). In step S113, CPU 10 may request of the representative MFP of the group to which the MFP which holds the job belongs, for the job body. Further, in a case where access information of the MFP which holds the job is obtained together with the job list, CPU 10 may request of the MFP which holds the job for the job body using the access information in step S113.

When CPU 10 obtains the selected job body, CPU 10 performs designated processing, such as printing of the job (step S115).

On the other hand, in a case where the log-in user is a user associated with the group to which MFP 100 belongs (YES in step S103), CPU 10 reads out information about jobs associated with the user from server 200 (step S117), and displays a selection screen for selecting a job to be processed on display 17 (step S119). When CPU 10 accepts a user operation for selecting a job to be selected on the screen (YES in step S121), CPU 10 reads out the selected job body from server 200 (step S123). Then, CPU 10 performs designated processing, such as printing of the job (step S115).

In a case where a job is not selected on the selection screen (NO in step S111, or NO in step S121), CPU 10 finishes a series of processing without performing the subsequent actions.

In a case where MFP 100 receives a request for a job list from another MFP (NO in step S101 and YES in step S125), CPU 10 reads out information about corresponding jobs from server 200 (step S127), and transmits a job list to the other MFP making that request (step S129).

In a case where MFP 100 receives a request for a job body from another MFP (NO in step S125), CPU 10 reads out the corresponding job body from server 200 (step S131), and transmits the job body to the other MFP making that request (step S133).

Another Example

It should be noted that, in the above example, in the case where the log-in user is not a user associated with the group to which MFP 100 belongs, MFP 100 performs a two-stage request. That is, MFP 100 requests of the representative MFPs of other groups for a job list, as a first stage, and requests transmission of a body of a selected job as a control request for the job, as a second stage. However, the request performed by MFP 100 is not limited to that performed in two stages.

As another example, in the case where the log-in user is not a user associated with the group to which MFP 100 belongs, MFP 100 may also request of the representative MFPs of other groups for transmission of a job body. This eliminates two-stage communication between MFP 100 and the representative MFP of each group as described above, and thus the amount of communication in the entire system can be suppressed.

On the other hand, in a case where many jobs associated with the log-in user are held, also requesting the job body in one stage results in transmission of many job bodies to MFP 100 in response to the request. Accordingly, the amount of communication in the entire system may be increased. Further, since many job bodies are transmitted to MFP 100, it may be difficult for the user to select a job to be processed from among them.

Consequently, MFP 100 preferably selects a necessary job when it accepts input of jobs from other MFPs. That is, job input unit 107 preferably includes a selection unit 110 as shown in FIG. 7, to select a job body to be obtained. Selection unit 110 selects a job body to be obtained, for example based on date and time information associated with the jobs, of the information about the jobs. Specifically, selection unit 110 makes a selection, for example, selection unit 110 obtains a predefined number of jobs counted from a job having the newest issue date and time, obtains jobs issued within a predefined period, or the like.

Effect of Embodiment

Since the present system operates as described above, even in a case where a user logs in MFP 100 of a different group and the group in which the user has logged has a system configuration different from that of a group with which the user is associated, the user can cause MFP 100 in which the user has logged to perform processing of a desired job without paying attention to the difference in group or the difference in system configuration. For example, there is a case where a user who usually uses a serverless ubiquitous system makes a business trip to another department where a ubiquitous system including a server is constructed, and desires to process a job managed by his or her original system using the ubiquitous system. In such a case, normally, even when the user logs in an MFP at the business trip destination, the MFP cannot access to an MFP included in the original system, and thus cannot process jobs associated with the user. However, in the present system, when the user logs in the MFP, the MFP automatically obtains a job list for the user from the original system. Thereby, even when the user logs in the MFP belonging to the different system at the business trip destination, the user can process the desired job in the same way as a case where the user logs in the MFP belonging to the original system. Therefore, the present system can remarkably improve the user's convenience. That is, the user can flexibly perform an operation for a job.

Furthermore, it is also possible to provide a program that causes CPU 10 of MFP 100 to execute the above operation. By providing such a program, an existing MFP can be operated as MFP 100.

Such a program can also be provided as a program product by being recorded in a computer-readable storage medium such as a flexible disk, a compact disk-read only memory (CD-ROM), a ROM, a RAM, or a memory card attached to a computer. Alternatively, the program can also be provided by being recorded in a recording medium such as a hard disk built in a computer. The program can also be provided by downloading through a network.

It should be noted that the program in accordance with the present disclosure may invoke a predetermined sequence of necessary modules, of program modules provided as a part of an operating system (OS) of a computer, at predetermined timing, and cause them to execute processing. In that case, the above modules are not included in the program itself, and processing is executed in cooperation with the OS. A program which does not include such modules may also be included in the program in accordance with the present disclosure.

Further, the program in accordance with the present disclosure may be provided with being incorporated into a part of another program. Also in that case, modules included in the other program are not included in the program itself, and processing is executed in cooperation with the other program. Such a program incorporated into the other program may also be included in the program in accordance with the present disclosure.

The program product to be provided is installed on a program storing unit such as a hard disk, for execution. It should be noted that the program product includes the program itself and the recording medium in which the program is recorded.

Although the embodiment of the present invention has been described, it should be understood that the embodiment disclosed herein is illustrative and non-restrictive in every respect. The scope of the present invention is defined by the scope of the claims, and is intended to include any modifications within the scope and meaning equivalent to the scope of the claims.

What is claimed is:

1. An image processing system comprising a plurality of image formation apparatuses,
   the plurality of image formation apparatuses constituting a plurality of groups each including one or more image formation apparatuses,
   one of the image formation apparatuses included in each of the plurality of groups serving as a representative apparatus performing communication with an image formation apparatus included in another group as a representative,
   the image processing system comprising a first memory apparatus for storing access information to the representative apparatus of the each group,
   each of the plurality of image formation apparatuses including
      a first request unit that requests, in a case where the image formation apparatus accepts log-in by a user associated with a group different from a group to which the image formation apparatus belongs, of the representative apparatus of the group different from the group to which the image formation apparatus belongs, for information about jobs which are associated with the log-in user whose log-in has been accepted and are stored in an image formation apparatus belonging to the group to which the representative apparatus belongs, based on the access information stored in the first memory apparatus,
      a display unit that displays a selection screen based on the information about the jobs from the representative apparatus, and
      a second request unit that outputs a control request for a job selected on the selection screen to the image formation apparatus storing the job.

2. The image processing system according to claim 1, further comprising a second memory apparatus for storing, for each user, information which specifies the group associated with the user, wherein
   each of the plurality of image formation apparatuses further includes a first determination unit that determines whether or not the log-in user is a user associated with the group to which the image formation apparatus belongs, based on the information stored in the second memory apparatus.

3. The image processing system according to claim 1, further comprising:
   a second memory apparatus for storing, for each user, information which specifies the group associated with the user; and
   a management apparatus, wherein
   the management apparatus includes
      a second determination unit that determines whether or not the log-in user is a user associated with the group to which the image formation apparatus which has accepted the log-in belongs, based on information which specifies the log-in user obtained from the image formation apparatus which has accepted the log-in and the information stored in the second memory apparatus, and
      a control unit that provides the image formation apparatus with a command indicating whether or not to permit the first request unit to make a request, based on a determination result obtained by the second determination unit, and
   each of the plurality of image formation apparatuses causes the first request unit to make the request to the representative apparatus, when permitted by the management apparatus.

4. The image processing system according to claim 2, wherein the first request unit requests of the representative apparatus of the group with which the log-in user is associated, of the plurality of groups, for the information about the jobs which are associated with the log-in user and are stored in the image formation apparatus belonging to the group.

5. The image processing system according to claim 1, wherein the image formation apparatus serving as the representative apparatus included in the each group further includes a transmission unit that receives a request for the information about the jobs associated with the log-in user from the image formation apparatus included in another group different from the group to which the representative apparatus belongs, obtains the information about the jobs from the image formation apparatus belonging to the group to which the image formation apparatus serving as the representative apparatus belongs, and transmits the information about the jobs to the image formation apparatus included in the other group.

6. The image processing system according to claim 1, wherein the image formation apparatus serving as the representative apparatus included in the each group further includes a registration unit that registers access information of the image formation apparatus in the first memory apparatus at predefined timing.

7. The image processing system according to claim 1, wherein the first request unit requests of the representative apparatus of the group different from the group to which the image formation apparatus belongs, for transmission of a job body associated with the log-in user as the information about the jobs.

8. The image processing system according to claim 7, wherein each of the plurality of image formation apparatuses further includes a selection unit that selects the job body to be obtained, from job bodies from the image formation apparatus storing the jobs, based on date and time information associated with each job body.

9. The image processing system according to claim 1, wherein
   the first request unit further requests of the representative apparatus of the group different from the group to which the image formation apparatus belongs, for information indicating a processing load state in the image formation apparatus storing the jobs, and
   the display unit displays the processing load state in the image formation apparatus storing the jobs, together with the selection screen.

10. The image processing system according to claim 9, wherein the information indicating the processing load state includes time taken until processing of each job can be started in the image formation apparatus storing the jobs.

11. The image processing system according to claim 1, wherein, in a case where the jobs associated with the log-in user are stored in the image formation apparatus which has accepted the log-in, the display unit displays the selection screen based on the jobs associated with the log-in user stored in the image formation apparatus.

12. The image processing system according to claim 1, wherein the second request unit outputs the control request to the image formation apparatus storing the job, based on access information of the image formation apparatus storing the job obtained from the representative apparatus of the group different from the group to which the image formation apparatus belongs, together with the information about the jobs.

13. An image formation apparatus which can communicate with another apparatus,
a plurality of the image formation apparatuses constituting a plurality of groups each including one or more image formation apparatuses,
one of the image formation apparatuses included in each of the plurality of groups serving as a representative apparatus performing communication with an image formation apparatus included in another group as a representative,
the image formation apparatus comprising:
an obtaining unit that obtains access information to the representative apparatus, from a memory apparatus storing the access information for the each group;
a log-in unit that accepts log-in by a user;
a first request unit that requests, in a case where the log-in user whose log-in has been accepted is not a user associated with a group to which the image formation apparatus belongs, of the representative apparatus of a group different from the group to which the image formation apparatus belongs, for information about jobs which are associated with the log-in user and are stored in an image formation apparatus belonging to the group to which the representative apparatus belongs;
a display unit that displays a selection screen based on the information about the jobs from the representative apparatus; and
a second request unit that outputs a control request for a job selected on the selection screen to the image formation apparatus storing the job.

14. A processing method for a job in an image processing system including a plurality of image formation apparatuses,
the plurality of image formation apparatuses constituting a plurality of groups each including one or more image formation apparatuses,
one of the image formation apparatuses included in each of the plurality of groups serving as a representative apparatus performing communication with an image formation apparatus included in another group as a representative,
for each group, access information to the representative apparatus of the group being stored in a memory apparatus,
the processing method comprising:
accepting log-in by a user in one image formation apparatus of the plurality of image formation apparatuses;
requesting, in a case where the log-in user whose log-in has been accepted is not a user associated with a group to which the one image formation apparatus belongs, of the representative apparatus of a group different from the group to which the one image formation apparatus belongs, for information about jobs which are associated with the log-in user and are stored in an image formation apparatus belonging to the group to which the representative apparatus belongs, from the one image formation apparatus;
displaying a selection screen in the one image formation apparatus, based on the information about the jobs from the representative apparatus; and
outputting a control request for a job selected on the selection screen from the one image formation apparatus to the image formation apparatus storing the job.

15. The processing method according to claim 14, further comprising determining whether or not the log-in user is a user associated with the group to which the one image formation apparatus belongs, based on information which specifies, for each user, the group associated with the user.

16. The processing method according to claim 14, further comprising:
determining whether or not the log-in user is a user associated with the group to which the one image formation apparatus which has accepted the log-in belongs, based on information which specifies the log-in user obtained from the one image formation apparatus which has accepted the log-in and information which specifies, for each user, the group associated with the user; and
providing the image formation apparatus with a command indicating whether or not to permit execution of a request by requesting the information about the jobs, based on a determination result, and
requesting the information about the jobs includes making the request to the representative apparatus when execution of the request is permitted.

17. A non-transitory computer-readable storage medium storing a control program for an image formation apparatus which can communicate with another apparatus,
a plurality of the image formation apparatuses constituting a plurality of groups each including one or more image formation apparatuses,
one of the image formation apparatuses included in each of the plurality of groups serving as a representative apparatus performing communication with an image formation apparatus included in another group as a representative,
for each group, access information to the representative apparatus of the group being stored in a memory apparatus,
the control program causing a computer mounted in the image formation apparatus to execute:
accepting log-in by a user;
requesting, in a case where the log-in user whose log-in has been accepted is not a user associated with a group to which the image formation apparatus belongs, of the representative apparatus of a group different from the group to which the image formation apparatus belongs, for information about jobs which are associated with the log-in user and are stored in an image formation apparatus belonging to the group to which the representative apparatus belongs, based on the access information to the representative apparatus stored in the memory apparatus;
displaying a selection screen based on the information about the jobs from the representative apparatus; and outputting a control request for a job selected on the selection screen to the image formation apparatus storing the job.

18. The non-transitory computer-readable storage medium according to claim 17, wherein the control program further causes the computer to execute:

determining whether or not the log-in user is a user associated with the group to which the image formation apparatus belongs, based on information which specifies, for each user, the group associated with the user.

19. The non-transitory computer-readable storage medium according to claim 17, wherein the image formation apparatus is configured to be able to communicate with a management apparatus, the management apparatus determines whether or not the log-in user is a user associated with the group to which the image formation apparatus which has accepted the log-in belongs, based on information which specifies the log-in user obtained from the image formation apparatus which has accepted the log-in and information which specifies, for each user, the group associated with the user, and provides the image formation apparatus with a command indicating whether or not to permit execution of a request by requesting the information about the jobs, based on a determination result, and requesting the information about the jobs includes making the request to the representative apparatus when permitted by the management apparatus.

* * * * *